United States Patent
Shishido (10) Patent No.: US 12,438,885 B2
(45) Date of Patent: Oct. 7, 2025

(54) IMAGE PROCESSING DEVICE, IMAGE PROCESSING METHOD, AND MEDIUM

(71) Applicant: JVCKENWOOD Corporation, Yokohama (JP)

(72) Inventor: Tomoyuki Shishido, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 223 days.

(21) Appl. No.: 18/466,866

(22) Filed: Sep. 14, 2023

(65) Prior Publication Data

US 2024/0007477 A1 Jan. 4, 2024

Related U.S. Application Data

(63) Continuation of application No. PCT/JP2022/009316, filed on Mar. 4, 2022.

(30) Foreign Application Priority Data

Mar. 19, 2021 (JP) ................. 2021-046053

(51) Int. Cl.
G06F 21/00 (2013.01)
G06T 11/00 (2006.01)
H04L 9/40 (2022.01)

(52) U.S. Cl.
CPC ............ *H04L 63/107* (2013.01); *G06T 11/00* (2013.01); *H04L 63/04* (2013.01); *H04L 63/105* (2013.01); *G06T 2210/62* (2013.01)

(58) Field of Classification Search
None
See application file for complete search history.

(56) References Cited

U.S. PATENT DOCUMENTS

2009/0150357 A1 6/2009 Iizuka
2012/0323893 A1 12/2012 Iizuka
(Continued)

FOREIGN PATENT DOCUMENTS

JP 2009-140197 6/2009
JP 2009129154 A * 6/2009 ........... H04L 67/131
(Continued)

OTHER PUBLICATIONS

Written Opinion for International Application No. PCT/JP2022/009316 mailed on Apr. 19, 2022, 5 pages.
(Continued)

*Primary Examiner* — Jeffery L Williams
(74) *Attorney, Agent, or Firm* — Amin, Turocy & Watson, LLP (57) ABSTRACT

Privacy of users is protected appropriately in communication via avatars in a virtual space. An image processing device includes: a positional information obtainment unit that obtains information on a position of an avatar (Aa) of a first user in a virtual space and a position of an avatar (Ba) of a second user in the virtual space (SV), the positions being in the virtual space; a boundary region obtainment unit that obtains information on a boundary region (ARA) that is a region around the avatar (Aa); a relation obtainment unit that obtains relational information indicating a relation between the first user and the second user; and an image processing unit that generates image data for the virtual space.

7 Claims, 7 Drawing Sheets

(56) References Cited

U.S. PATENT DOCUMENTS

| | | | |
|---|---|---|---|
| 2012/0323894 A1 | 12/2012 | Iizuka | |
| 2019/0215372 A1* | 7/2019 | Quan | A63F 13/2145 |
| 2020/0118349 A1* | 4/2020 | Amimoto | A63F 13/63 |
| 2022/0124125 A1* | 4/2022 | Punwani | G06F 3/04815 |
| 2024/0320925 A1* | 9/2024 | Chai | H04L 51/10 |

FOREIGN PATENT DOCUMENTS

| | | | |
|---|---|---|---|
| JP | 2009-271618 | 11/2009 | |
| WO | 2018/216602 | 11/2018 | |
| WO | WO-2023016089 A1 * | 2/2023 | A63F 13/533 |

OTHER PUBLICATIONS

Solphy, No need for VR and also communication skills! VRChat to start from now. [online], Jan. 11, 2020, https://note.com/solphy/n/n7a86ddd40cb1, [retrieval date: Apr. 4, 2022] Particularly, it is a clause of "Comfort and Safety".

International Search Report and Written Opinion for International Application No. PCT/JP2022/009316 mailed on Apr. 19, 2022, 10 pages.

* cited by examiner

IMAGE PROCESSING DEVICE, IMAGE PROCESSING METHOD, AND MEDIUM

CROSS-REFERENCE TO RELATED APPLICATION

This application is a Continuation of PCT International Application No. PCT/JP2022/009316 filed on Mar. 4, 2022 which claims the benefit of priority from Japanese Patent Application No. 2021-046053 filed on Mar. 19, 2021, the entire contents of both of which are incorporated herein by reference.

BACKGROUND

1. Technical Field

The present disclosure relates to an image processing device, an image processing method, and a program.

2. Description of the Related Art

Information devices are evolving largely these days. Not only smartphones, which are a typical example of these information devices, but also so-called wearable devices have become widely used. Eyeglass-type head-mounted displays (HMDs) that directly stimulate vision have been known as wearable devices. Using such an HMD enables provision of a virtual space to a user U by display of a video in accordance with a line of sight of the user U. In recent years, users are communicating with each other more via avatars in virtual spaces. For example, what is described in Japanese Unexamined Patent Application Publication No. 2009-271618 is changing the mode of display of an image according to a positional relation between an image and an avatar in a virtual space. What is described in Japanese Unexamined Patent Application, Publication No. 2009-140197 is dividing a virtual space into blocks and managing a history of actions by an avatar on the basis of any blocks that the avatar has entered.

However, there is also a demand for protection of privacy for communication among plural users via avatars in a virtual space.

SUMMARY

It is an object of the present disclosure to at least partially solve the problems in the conventional technology.

An image processing device according to an embodiment that performs image processing for a virtual space is disclosed. The image processing device includes a positional information obtainment unit that obtains information on a position of a first avatar that is an avatar of a first user in the virtual space and a position of a second avatar that is an avatar of a second user in the virtual space, the positions being in the virtual space, a boundary region obtainment unit that obtains information on a first boundary region set for the first avatar, the first boundary region being a region in the virtual space and around the first avatar, a relation obtainment unit that obtains relational information indicating a relation between the first user and the second user, and an image processing unit that generates image data for the virtual space such that a first mode of display of the first avatar for when the second avatar is positioned in the first boundary region is made different from a second mode of display of the first avatar for when the second avatar is positioned outside the first boundary region, in a case where the relation does not satisfy a predetermined condition. The image processing unit determines that the predetermined condition is satisfied in a case where the relation indicates that the first user and the second user have a friendship with each other, and the image processing unit changes the first boundary region according to a level of the friendship, and when the first avatar and a third avatar that is an avatar of a third user in the virtual space are communicating with each other, changes the first boundary region.

An image processing method according to an embodiment of performing image processing for a virtual space is disclosed. The image processing method includes a step of obtaining information on a position of a first avatar that is an avatar of a first user in the virtual space and a position of a second avatar that is an avatar of a second user in the virtual space, the positions being in the virtual space, a step of obtaining information on a first boundary region set for the first avatar, the first boundary region being a region in the virtual space and around the first avatar, a step of obtaining relational information indicating a relation between the first user and the second user, and a step of generating image data for the virtual space such that a first mode of display of the first avatar for when the second avatar is positioned in the first boundary region is made different from a second mode of display of the first avatar for when the second avatar is positioned outside the first boundary region, in a case where the relation does not satisfy a predetermined condition. The step of generating the image data includes determining that the predetermined condition is satisfied in a case where the relation indicates that the first user and the second user have a friendship with each other, and changing the first boundary region according to a level of the friendship, and when the first avatar and a third avatar that is an avatar of a third user in the virtual space are communicating with each other, changing the first boundary region.

A non-transitory computer readable recording medium according to an embodiment storing therein a program that causes a computer to execute an image processing method of performing image processing for a virtual space is disclosed. The program causes the computer to execute a step of obtaining information on a position of a first avatar that is an avatar of a first user in the virtual space and a position of a second avatar that is an avatar of a second user in the virtual space, the positions being in the virtual space, a step of obtaining information on a first boundary region set for the first avatar, the first boundary region being a region in the virtual space and around the first avatar, a step of obtaining relational information indicating a relation between the first user and the second user, and a step of generating image data for the virtual space such that a first mode of display of the first avatar for when the second avatar is positioned in the first boundary region is made different from a second mode of display of the first avatar for when the second avatar is positioned outside the first boundary region, in a case where the relation does not satisfy a predetermined condition. The step of generating the image data includes determining that the predetermined condition is satisfied in a case where the relation indicates that the first user and the second user have a friendship with each other, and changing the first boundary region according to a level of the friendship, and when the first avatar and a third avatar that is an avatar of a third user in the virtual space are communicating with each other, changing the first boundary region.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Figure 1:
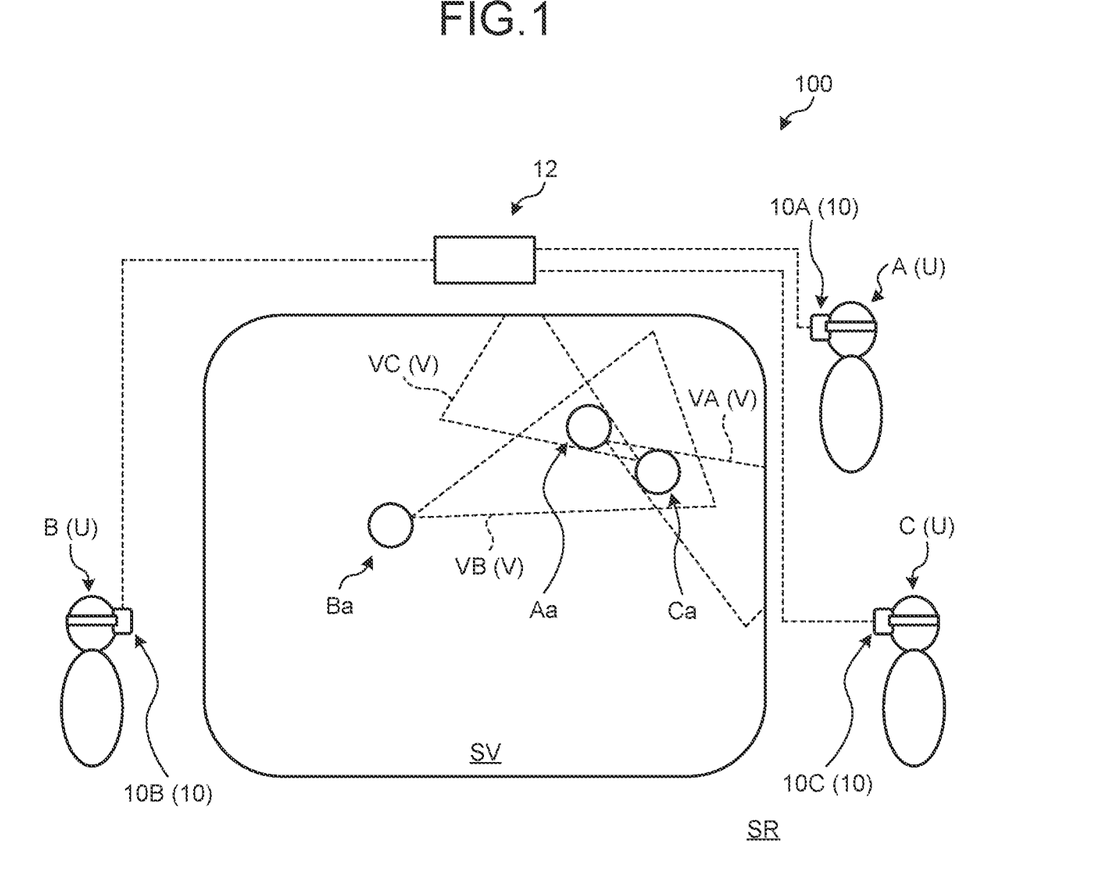
FIG. 1 is a schematic diagram illustrating an example of a real space and a virtual space.

An embodiment will be described hereinafter in detail, on the basis of the drawings. The embodiment is not limited by the embodiment described hereinafter.
Real Space and Virtual Space
FIG. 1 is a schematic diagram illustrating an example of a real space and a virtual space. An image processing system 100 according to an embodiment is a system that provides a virtual space to users U and includes display devices 10 and an image processing device 12. As illustrated in FIG. 1, the display devices 10 are so-called head-mounted displays (HMDs) mounted on the heads of the users U. The display devices 10 provide the virtual space to the users U by displaying images. As illustrated in FIG. 1, an actual space where the users U are actually present will be referred to as a real space SR and the virtual space provided by the display devices 10 to the users U will be referred to as a virtual space SV. In this case, the display devices 10 display images for the virtual space SV according to movements (lines of sight) of the users U in the real space SR. That is, the display devices 10 display the images for the virtual space SV by simulating the movements of the users U as avatars in the virtual space SV. Therefore, the users U are able to perceive that the users U themselves are present in the virtual space SV. The virtual space SV may be a space reproducing an existent place separate from a place where the users U are present, that is, mixed reality (MR), or may be a virtual space that does not actually exist, that is, virtual reality (VR).

Figure 2:
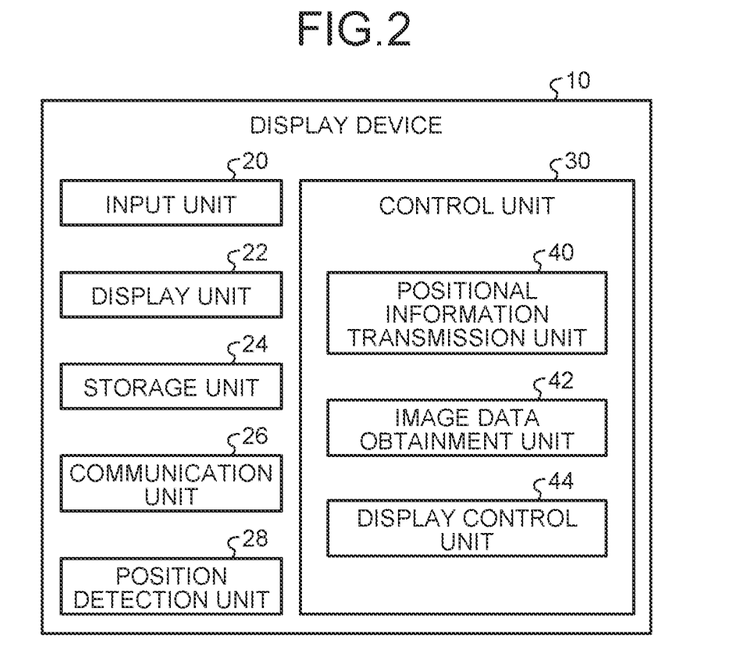
FIG. 2 is a schematic block diagram of a display device according to an embodiment.

In this embodiment, the image processing system 100 provides the virtual space SV that is common to the plural users U. Display devices 10 are respectively used by the users U, and each of the users U is able to communicate with the other users U via avatars in the virtual space SV provided by the display device 10 of that user U. In the example of FIG. 1, a user A is wearing a display device 10A, a user B is wearing a display device 10B, and a user C is wearing a display device 10C, and avatars of the users A, B, and C in the common virtual space SV will be respectively referred to as avatars Aa, Ba, and Ca. The display device 10A provides an image for the virtual space SV to the user A, the image being an image in the virtual space SV in a field of view VA of the avatar Aa. Similarly, the display device 10B provides an image for the virtual space SV to the user B, the image being an image in the virtual space SV in a field of view VB of the avatar Ba. Similarly, the display device 10C provides an image for the virtual space CV to the user C, the image being an image in the virtual space SV in a field of view VC of the avatar Ca. The number of avatars in the virtual space SV (that is, the number of the users U to which the common virtual space SV is provided) is not limited to three and may be any number. Furthermore, the drawings including FIG. 1 illustrate the virtual space SV in a two-dimensional plane viewed vertically from above but the virtual space SV may be a three-dimensional space.
Display Device
FIG. 2 is a schematic block diagram illustrating a display device according to the embodiment. The display device 10 may also be said to be a computer and includes, as illustrated in FIG. 2, an input unit 20, a display unit 22, a storage unit 24, a communication unit 26, a position detection unit 28, and a control unit 30. The input unit 20 is a mechanism that receives operation by a user U and may be, for example, a controller and a microphone provided in the HMD. The display unit 22 is a display that displays an image. By outputting an image, the display unit 22 provides the virtual space SV to the user U. The display device 10 may include a device that output information, such as a speaker that outputs sound, for example, in addition to the display unit 22.

The storage unit 24 is a memory that stores various kinds of information, such as content of calculation by the control unit 30 and programs for the control unit 30, and includes, for example, at least one of: a random access memory (RAM); a main storage, such as a read only memory (ROM); and an external storage, such as a hard disk drive (HDD). The programs stored in the storage unit 24, the programs being for the control unit 30, may be stored in a recording medium that is able to be read by the display device 10.

The communication unit 26 is a communication module that performs communication with an external device, such as the image processing device 12, and is, for example, an antenna. The display device 10 performs the communication with the external device wirelessly, but the communication may be wired, and any communication method may be adopted.

The position detection unit 28 is a sensor that detects a position (coordinates) of the user U (display device 10) in the real space SR, and an orientation (a direction to which the face or line of sight of the user U is directed, for example) of the user U (display device 10) in the real space SR. The position detection unit 28 may be any sensor that is capable of detecting a position and an orientation of the user U and may be, for example, a gyroscope sensor and/or a camera. The position detection unit 28 is not limited to being provided singly, plural position detection units 28 may be provided, and for example, a sensor that detects a position of the user U and a sensor that detects an orientation of the user U may be included.

The control unit 30 is a calculation device and includes, for example, a calculation circuit, such as a central processing unit (CPU). The control unit 30 includes a positional information obtainment unit 40, an image data obtainment unit 42, and a display control unit 44. By reading and executing the programs (software) from the storage unit 24, the control unit 30 implements the positional information obtainment unit 40, the image data obtainment unit 42, and the display control unit 44 to execute their processes. The control unit 30 may execute these processes by means of a single CPU or may include plural CPUs and execute the processes by means of these plural CPUs. At least part of the processes by the positional information obtainment unit 40, the image data obtainment unit 42, and the display control unit 44 may be implemented by a hardware circuit.

The positional information obtainment unit 40 obtains positional information on the user U, the positional information being information on a position of the user U in the real space SR and information on an orientation of the user U in the real space SR. The positional information obtainment unit 40 controls the position detection unit 28 to cause the position detection unit 28 to detect the position and orientation of the user U (display device 10) and obtains results of the detection as the positional information on the user U.

The image data obtainment unit 42 obtains image data for the virtual space SV to be displayed by the display unit 22. In this embodiment, the image data obtainment unit 42 obtains the image data for the virtual space SV from the image processing device 12 via the communication unit 26. Details of the image data for the virtual space SV will be described later.

The display control unit 44 causes the display unit 22 to display an image for the virtual space SR, the image having been obtained by the image data obtainment unit 42.

Image Processing Device

The image processing device 12 is a device that performs image processing of an image for the virtual space SV. The image processing device 12 may be said to be a server that performs image processing of an image for the virtual space SV by transmitting and receiving information to and from the display device 10 of each user U.

Figure 3:
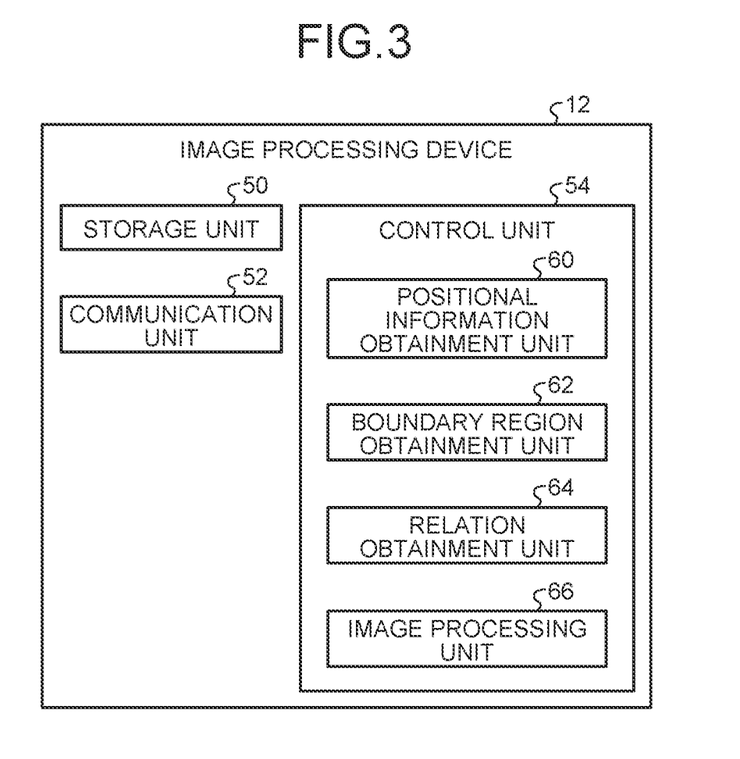
FIG. 3 is a schematic block diagram of an image processing device according to the embodiment.

FIG. 3 is a schematic block diagram illustrating an image processing device according to the embodiment. The image processing device 12 may also be said to be a computer and as illustrated in FIG. 3, includes a storage unit 50, a communication unit 52, and a control unit 54.

The storage unit 50 is a memory that stores various types of information, such as content of calculation by the control unit 54 and programs for the control unit 54, and includes, for example, at least one of a RAM, a main storage like a ROM, and an external storage, such as an HDD. The programs stored in the storage unit 50, the programs being for the control unit 54, may be stored in a recording medium that is able to be read by the image processing device 12.

The communication unit 52 is a communication module that performs communication with external devices, such as the display devices 10, and is, for example, an antenna. The image processing device 12 performs the communication with the external devices wirelessly, but the communication may be wired, and any communication method may be adopted.

The control unit 54 is a calculation device and includes, for example, a calculation circuit, such as a CPU. The control unit 54 includes a positional information obtainment unit 60, a boundary region obtainment unit 62, a relation obtainment unit 64, and an image processing unit 66. By reading and executing the programs (software) from the storage unit 50, the control unit 54 implements the positional information obtainment unit 60, the boundary region obtainment unit 62, the relation obtainment unit 64, and the image processing unit 66 to execute their processes. The control unit 54 may execute these processes by means of a single CPU or may include plural CPUs and execute the processes by means of these plural CPUs. At least part of the processes by the positional information obtainment unit 60, the boundary region obtainment unit 62, the relation obtainment unit 64, and the image processing unit 66 may be implemented by a hardware circuit.

Positional Information Obtainment Unit

The positional information obtainment unit 60 obtains positional information on the avatars of the users U in the virtual space SV, that is, information on positions and orientations of the avatars in a coordinate system of the virtual space SV. Specifically, the positional information obtainment unit 60 obtains positional information on the users U (information on positions and orientations of the users U in a coordinate system of the real space SR) respectively from the display devices 10 via the communication unit 52. The positional information obtainment unit 60 calculates the positions and orientations of the avatars in the coordinate system of the virtual space SV by performing coordinate transformation of the positions and orientations of the users U in the coordinate system of the real space SR into those for the coordinate system of the virtual space SV. That is, in this example, the positional information obtainment unit 60 sets positional information on the avatar Aa by obtaining positional information on the user A from the display device 10A and performing coordinate transformation of the positional information. Furthermore, the positional information obtainment unit 60 sets positional information on the avatar Ba by obtaining positional information on the user B from the display device 10B and performing coordinate transformation of the positional information. The positional information obtainment unit 60 also sets positional information on the avatar Ca by obtaining positional information on the user C from the display device 10C and performing coordinate transformation of the positional information. Any method may be adopted for the transformation from the coordinate system of the real space SR to the coordinate system of the virtual space SV, but for example, numerical values for the coordinate transformation may be set beforehand.

Boundary Region Obtainment Unit

Figure 4:
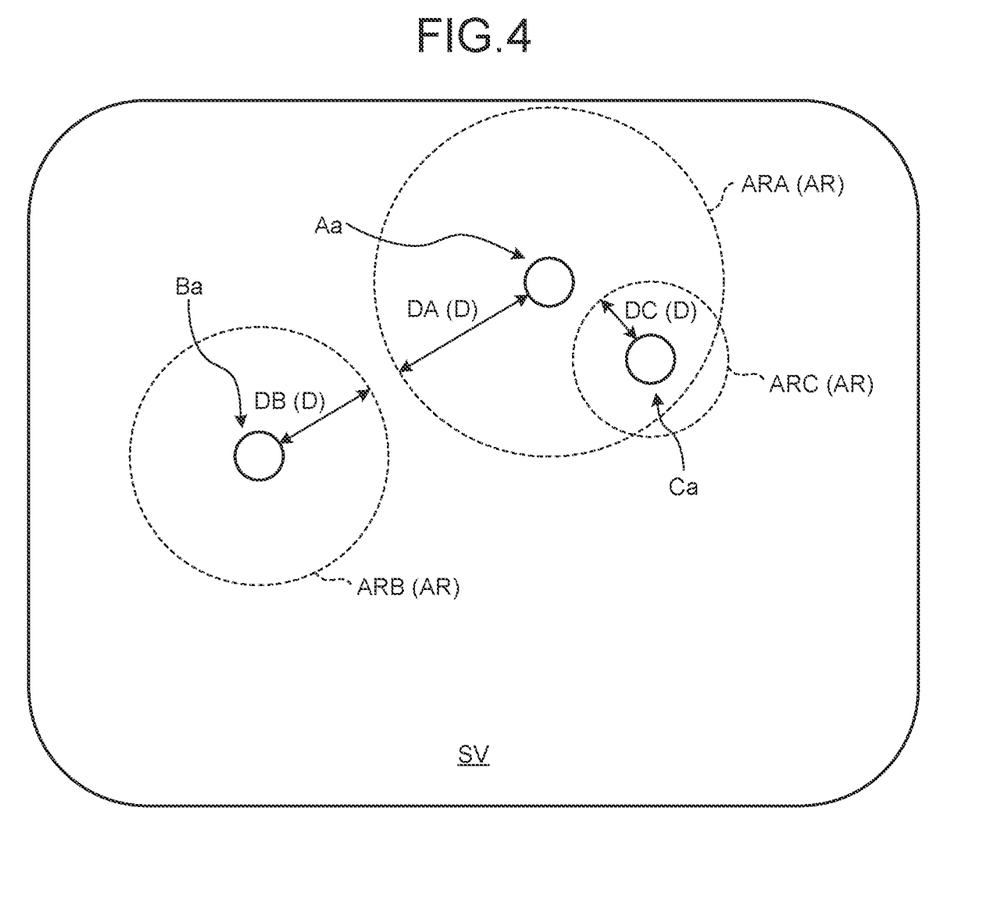
FIG. 4 is a schematic diagram illustrating an example of boundary regions.

FIG. 4 is a schematic diagram illustrating an example of boundary regions. The boundary region obtainment unit 62 obtains information on boundary regions AR respectively set for the avatars. The boundary regions AR are regions having predetermined sizes around the avatars and have been set respectively for the avatars. That is, the boundary region obtainment unit 62 may be said to obtain information on the sizes of the boundary regions AR for the respective avatars. This information on the sizes may be, for example, information indicating distances D from outer peripheries of the boundary regions AR to the avatars positioned in the boundary regions AR. In the example of FIG. 4, the boundary regions AR are circular regions (a cylindrical or hemispherical space in a case where the circular region is three-dimensional) around the avatars, the circular regions having the distances D as their radii, but without being limited to this example, the boundary regions AR may be regions (or spaces) having any shapes. The boundary regions AR are regions around the avatars and positions of the boundary regions AR are thus moved in association with movement of positions of the avatars.

The information on the boundary regions AR is set by, for example, the users U. That is, a user U inputs information on the boundary region AR (the distance D in this embodiment) for the user U's avatar through the input unit 20 of the display device 10 and the boundary region obtainment unit 62 obtains the information on the boundary region AR, from the display device 10. However, the information on the boundary region AR is not necessarily set by the user U and may be set beforehand, for example.

In the example of FIG. 4, the boundary region obtainment unit 62 obtains information on a boundary region ARA for the avatar Aa, information on a boundary region ARB for the avatar Ba, and information on a boundary region ARC for the avatar Ca. In the example of FIG. 4, the boundary region ARA is a circular region around a position of the avatar Aa, the circular region having a radius equal to a distance DA, the boundary region ARB is a circular region around a position of the avatar Ba, the circular region having a radius equal to a distance DB, and the boundary region ARC is a circular region around a position of the avatar Ca, the circular region having a radius equal to a distance DC. However, the positions and boundary regions AR of the avatars illustrated in FIG. 4 are just an example.

Relation Obtainment Unit

The relation obtainment unit 64 obtains relational information indicating relations between the users U. In this embodiment, the relational information is information indicating whether the users U have a friendship with each other. For example, the relational information is set as friend information indicating that the users U have a friendship with each other and non-friend information indicating that the users U have no friendship with each other. The relational information is set by the users U. For example, in response to the user A inputting a friend application for a friendship with the user B to the display device 10A, the image processing device 12 obtains information on the friend application from the display device 10A and transmits the information to the display device 10B of the user B. The user B checks, via the display device 10B, the information indicating that the friend application has been made and inputs information to the display device 10B, the information indicating that the friend application is approved in a case where the user B approves the friend application. Upon obtainment of the information from the display device 10B, the information indicating that the friend application has been approved, the image processing device 12 sets a relation between the user A and the user B to the friend information and stores the friend information into the storage unit 50. The image processing device 12 sets relational information between users U to non-friend information, the users U not having been set to the friend information. By reading relational information between users U from the storage unit 50, the relation obtainment unit 64 obtains the relational information. Any method of setting the relational information may be adopted without being limited to the above described method. For example, in response to the user A inputting a non-friend application to the display device 10A, the image processing device 12 obtains information on the non-friend application from the display device 10A, the non-friend application being for no friendship with the user B. In this case, the image processing device 12 sets relational information between the user A and the user B to non-friend information.

In this embodiment, relational information is set for each combination of two users U. That is, in this example, relational information on the users A and B, relational information on the users B and C, and relational information on the users A and C have been set. The relation obtainment unit 64 obtains the relational information on the users A and B, the relational information on the users B and C, and the relational information on the users A and C. The relational information is not limited to the two types, the friend information and the non-friend information, and may be set to three or more levels according to the level of the friendship.

Image Processing Unit

The image processing unit 66 generates image data for the virtual space SV. The image processing unit 66 determines a field of view V of an avatar from positional information on the avatar set by the positional information obtainment unit 60 and extracts any virtual object or other avatar that is in the field of view V in the virtual space SV. The image processing unit 66 then generates the image data for the virtual space SV so that an image of the extracted object or other avatar will be at a position and will have a size and an orientation, as viewed from the position and orientation of the avatar. Image data representing a figure of an avatar are set by the user U of that avatar via the display device 10 and the image processing unit 66 obtains the image data representing the figure of the avatar from the display device 10. However, any method of obtaining image data representing a figure of an avatar may be adopted, and for example, the image data may be automatically set by the image processing unit 66.

The image processing unit 66 transmits the generated image data for the virtual space SV, to the display device 10 via the communication unit 52. The display device 10 displays, by means of the display control unit 44, an image for the virtual space SV by using the image data for the virtual space SV transmitted from the image processing unit 66 (image processing device 12). That is, in this example, the image processing unit 66 generates the image data for the virtual space SV as viewed from the field of view V of the avatar Aa and transmits the image data to the display device 10A. On the basis of the image data received from the image processing unit 66, the display device 10A displays an image for the virtual space SV on the display unit 22, the image being an image as viewed from the field of view V of the avatar Aa. Similarly, the image processing unit 66 generates image data for the virtual space SV as viewed from the field of view V of the avatar Ba and transmits the image data to the display device 10B. On the basis of the image data received from the image processing unit 66, the display device 10B displays an image for the virtual space SV on the display unit 22, the image being an image as viewed from the field of view V of the avatar Ba. Similarly, the image processing unit 66 generates image data for the virtual space SV as viewed from the field of view V of the avatar Ca and transmits the image data to the display device 10C. On the basis of the image data received from the image processing unit 66, the display device 10C displays an image for the virtual space SV on the display unit 22, the image being an image as viewed from the field of view V of the avatar Ca. The users A, B, and C are thereby able to perceive as if the users A, B, and C themselves are in the virtual space SV as the avatars Aa, Ba, and Ca, and to communicate with one another via the avatars Aa, Ba, and Ca.

Similarly to communication between the users U in the real space SR, in such communication via the avatars in the virtual space SV, there is sometimes a demand for protection of privacy. For example, just like how there are people who do not wish to be watched closely by a stranger at a near distance in a real space SR, there are some people who do not wish their own avatars to be watched closely by another user. The image processing device 12 according to the embodiment thus implements protection of privacy by setting a boundary region AR for each avatar and making the way an avatar looks (mode of display) to another user different to thereby make the avatar difficult to be watched closely by the other user in a case where the avatar of the other user has entered the boundary region AR of the avatar. The following description is on a specific example of this protection of privacy.

Determination of Relational Information

The image processing unit 66 determines whether relational information between users obtained by the relation obtainment unit 64 satisfies a predetermined condition. In this embodiment, in a case where relational information has been set as friendship information, that is, in a case where users U have a friendship with each other, the image processing unit 66 determines that the predetermined condition is satisfied. On the contrary, in a case where the relational information has been set as non-friendship information, that is, in a case where the users U have no friendship with each other, the image processing unit 66 determines that the predetermined condition is not satisfied. Whether the predetermined condition is satisfied may be determined on the basis of any standard as appropriate without being limited to being determined on the basis of whether the users U are in a state of having a friendship with each other.

When Relational Information does not Satisfy Predetermined Condition

What is described hereinafter is an example of a case where relational information on the user A and the user B does not satisfy the predetermined condition (a case where the users A and B do not have a friendship with each other), the avatar Aa of the user A is in the field of view V of the avatar Ba of the user B, and image data on the avatar Aa to be provided to the display device 10B of the user B are generated. However, the following description is also applicable to relations between the other users U.

Figure 5:
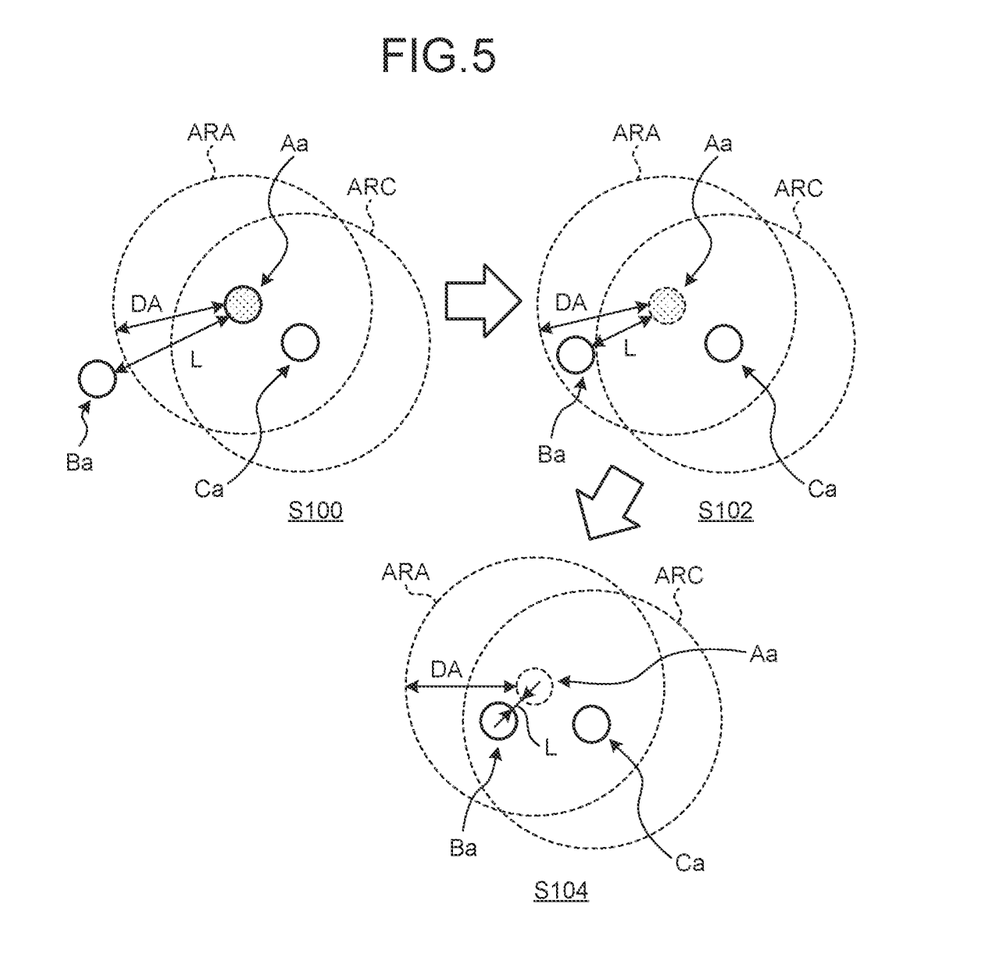
FIG. 5 is a schematic diagram illustrating an example of modes of display for an avatar.

FIG. 5 is a schematic diagram illustrating an example of modes of display for an avatar. In a case where relational information on the users A and B does not satisfy the predetermined condition (in a case where the users A and B do not have a friendship with each other), the image processing unit 66 determines whether the avatar Ba is positioned in the boundary region ARA of the avatar Aa. For example, from positional information on the avatar Aa and information on the size of the boundary region ARA, the image processing unit 66 determines position occupied by the boundary region ARA in the virtual space SV and determines a position of the avatar Ba in the virtual space SV from positional information on the avatar Ba. In a case where the position of the avatar Ba in the virtual space SV overlaps the boundary region ARA, the image processing unit 66 determines that the avatar Ba is positioned in the boundary region ARA of the avatar Aa, and in a case where the position of the avatar Ba does not overlap the boundary region ARA, the image processing unit 66 determines that the avatar Ba is not positioned in the boundary region ARA. In FIG. 5, Step S100 illustrates an example of a case where the avatar Ba is not positioned in the boundary region ARA of the avatar Aa and Steps S102 and S104 illustrate examples of a case where the avatar Ba is positioned in the boundary region ARA of the avatar Aa.

However, the method of determining whether the avatar Ba is positioned in the boundary region ARA of the avatar Aa is not limited to the above description. For example, the image processing unit 66 may calculate a distance L between the avatar Aa and the avatar Ba in the virtual space SV, from positional information on the avatars Aa and Ba. The image processing unit 66 may then obtain a distance D as information on the size of the boundary region ARA, determine that the avatar Ba is in the boundary region ARA of the avatar Aa in a case where the distance L is equal to or less than the distance D, and determine that the avatar Ba is not positioned in the boundary region ARA of the avatar Aa in a case where the distance L is longer than the distance D.

The image processing unit 66 generates image data on the avatar Aa to be provided to the display device 10B, such that the mode of display of the image data for the avatar Aa to be provided to the display device 10B of the user B in the case where the avatar Ba is positioned in the boundary region ARA of the avatar Aa is made different from the mode of display of the image data for the avatar Aa to be provided to the display device 10B of the user B in the case where the avatar Ba is not positioned in the boundary region ARA of the avatar Aa. That is, in a case where the user A and the user B do not have a friendship with each other and the avatar Ba of the user B has entered the boundary region ARA of the avatar Aa of the user A, the mode of display of the avatar Aa to be seen by the user B is changed.

The mode of display referred to herein corresponds to a parameter of the image data, the parameter influencing visibility of the image of the avatar Aa. That is, the image processing unit 66 makes visibility of the image of the avatar Aa for when the avatar Ba is positioned in the boundary region ARA of the avatar Aa lower than visibility of the image of the avatar Aa for when the avatar Ba is positioned outside the boundary region ARA of the avatar Aa (that is, the image processing unit 66 makes the avatar Aa more difficult to be seen by the user B). As positions and orientations of the avatars Aa and Ba relative to each other change, the size and apparent orientation of the avatar Ba change, but the mode of display referred to herein does not mean the size and apparent orientation of the avatar Ba. The mode of display herein refers to a parameter related to the visibility of the avatar Ba and this visibility changes as the mode of display changes even if, for example, the avatar Ba is assumed to be seen at the same relative distance and relative orientation.

The mode of display in this embodiment refers to the degree of transparency of the image of the avatar Ba. That is, in this embodiment, in the case where the relational information on the user A and user B does not satisfy the predetermined condition, the image processing unit 66 generates image data for the avatar Aa to be provided to the display device 10B such that the degree of transparency of the image of the avatar Aa for when the avatar Ba is positioned in the boundary region ARA of the avatar Aa is made higher than the degree of transparency of the image of the avatar Aa for when the avatar Ba is not positioned in the boundary region ARA of the avatar Aa.

Furthermore, in this embodiment, in the case where the positional relation on the user A and the user B does not satisfy the predetermined condition and the avatar Ba is positioned in the boundary region ARA of the avatar Aa, the image processing unit 66 increases the degree of change in the mode of display of the avatar Aa as the distance L between the avatar Aa and the avatar Ba becomes shorter. That is, once the avatar Ba has entered the boundary region ARA of the avatar Aa, the image processing unit 66 decreases the visibility of the image of the avatar Aa more as the distance between the avatar Aa and the avatar Ba becomes shorter. In this embodiment, as illustrated by Step S102 in FIG. 5, in response to the avatar Ba entering the boundary region ARA of the avatar Aa, the degree of transparency of the image of the avatar Aa is increased from that at Step S100 where the avatar Ba is outside the boundary region ARA of the avatar Aa. Furthermore, as the distance L between the avatar Aa and the avatar Ba becomes shorter than that at Step S102, the degree of transparency of the image of the avatar Aa is increased. As illustrated by Step S104, when the distance L between the avatar Aa and the avatar Ba has decreased to a predetermined value, the image of the avatar Aa becomes completely transparent and the image of the avatar Aa is no longer displayed.

As described above, in the case where the positional information on the user A and the user B does not satisfy the predetermined condition, as the avatar Ba approaches the avatar Aa (as the avatar Ba enters the boundary region ARA), the visibility of the avatar Aa in the image seen by the user B is reduced. Therefore, the avatar Aa becomes difficult to be closely watched by the user B and privacy of the user A in the virtual space SV is able to be protected. Furthermore, in this embodiment, as the distance L becomes shorter after the avatar Ba entering the boundary region ARA, the avatar Aa gradually becomes more transparent without disappearing suddenly. The user B is thereby able to see the avatar Aa and make a friend application to the user A, before the avatar Aa becomes completely transparent and the user B is no longer able to recognize the presence of the avatar Aa, for example. Therefore, the embodiment enables protection of privacy and assistance in communication. That is, in this case, the image processing system 100 may accept any friend application to the user A until the avatar Aa completely disappears.

According to the above description, there are two types of relational information, the friendship information and the non-friendship information, but in a case where there are three or more levels, how the mode of display of the avatar Aa is changed may be adjusted according to the level of friendship. In this case, for example, the lower the level of friendship is, the larger the boundary region AR may be made so that the avatar Aa becomes difficult to be seen from afar. Furthermore, for example, the lower the level of friendship is, the larger the degree of change in the mode of display (the degree of transparency herein) may be made for the entrance into the boundary region AR, or the reduction of visibility (that is, the speed at which the transparency is increased) may be increased in a case where the distance L has decreased by a unit length since entrance into the boundary region AR so that the avatar Aa becomes difficult to be seen when approached.

Another Example of Modes of Display

Figure 6:
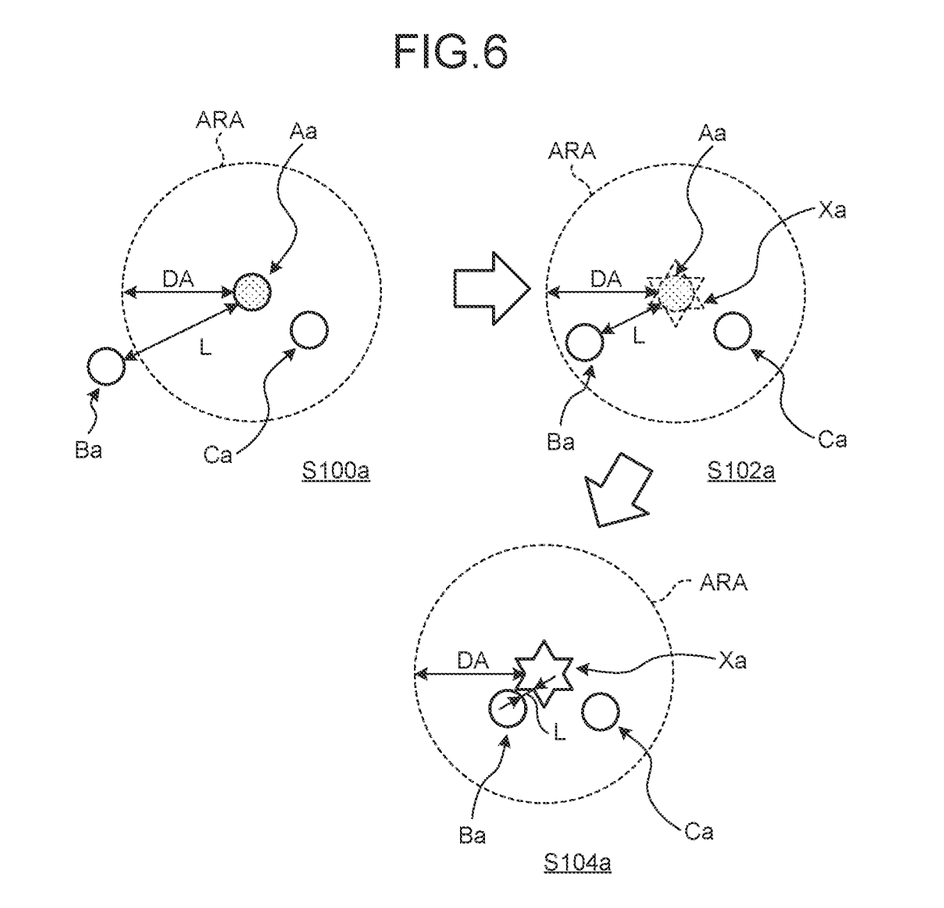
FIG. 6 is a schematic diagram illustrating another example of modes of display for an avatar.

FIG. 6 is a schematic diagram illustrating another example of modes of display for an avatar. According to the above description, the transparency of an image of the avatar Aa is changed as a mode of display of avatars, but the mode of display is not limited to transparency. For example, as illustrated in FIG. 6, the mode of display may be changed such that the avatar Aa is converted to another avatar Xa by displaying an image of the other avatar Xa at a position overlapping the avatar Aa. That is, displaying the other avatar Xa at the position overlapping the avatar Aa reduces the visibility of the avatar Aa. In this case, for example, as illustrated by Step S100a in FIG. 6, in the case where the avatar Ba is not in the boundary region ARA of the avatar Aa, the avatar Aa is displayed without the avatar Xa being displayed. By contrast, as illustrated by Step S102a, in the case where the avatar Ba is positioned in the boundary region ARA of the avatar Aa, the avatar Xa is displayed at a position overlapping the avatar Aa. As the distance L between the avatar Aa and the avatar Ba becomes shorter, for example, the transparency of the avatar Xa may be lowered (that is, the avatar Xa may become more clearly visible) and the transparency of the avatar Aa may conversely be increased. As illustrated by Step S104a, when the distance L between the avatar Aa and the avatar Ba has decreased to a predetermined value, the image of the avatar Aa becomes completely transparent and only the image of the avatar Xa is displayed at the position of the avatar Aa. The image of the figure of the avatar Xa herein may be set in any way, and any figure different from that of the avatar Aa may be adopted.

Changing the mode of display is not limited to increasing the transparency and converting to the other avatar Xa (morphing). For example, changing the mode of display may be decreasing the resolution of the avatar Aa.

When Relational Information Satisfies Predetermined Condition

What is described hereinafter is an example of a case where relational information between the user B and the user C satisfies the predetermined condition (that is, a case where the user B and the user C have a friendship with each other), the avatar Ca of the other user C is in the field of view V of the avatar Ba of the user B, and image data on the avatar Ca to be provided to the display device 10B of the user B are generated. The following description is also applicable to relations between the other users U.

In the case where the relational information satisfies the predetermined condition (in the case where the users B and C have a friendship with each other, herein), the image processing unit 66 generates the image data on the avatar Ca to be provided to the display device 10B such that the mode of display of the image data on the avatar Ca to be provided to the display device 10B of the user B in a case where the avatar Ca is positioned in the boundary region ARC of the avatar Ca is made the same as the mode of display of the image data on the avatar Ca to be provided to the display device 10B of the user B in a case where the avatar Ba is not positioned in the boundary region ARC of the avatar Ca. That is, in the example of FIG. 5, the transparency (visibility) of the avatar Ca for Step S100 and Step S102 at which the avatar Ba is positioned outside the boundary region ARC of the avatar Ca is the same as the transparency (visibility) of the avatar Ca for Step S104 at which the avatar Ba is positioned in the boundary region ARC of the avatar Ca. Furthermore, even if the distance L between the avatar Ca and the avatar Ba decreases, the mode of display is not changed. Therefore, in the case where the users B and C have a friendship with each other, the avatar Ca is visible regardless of the distance L therebetween.

Flow of Process

Figure 7:
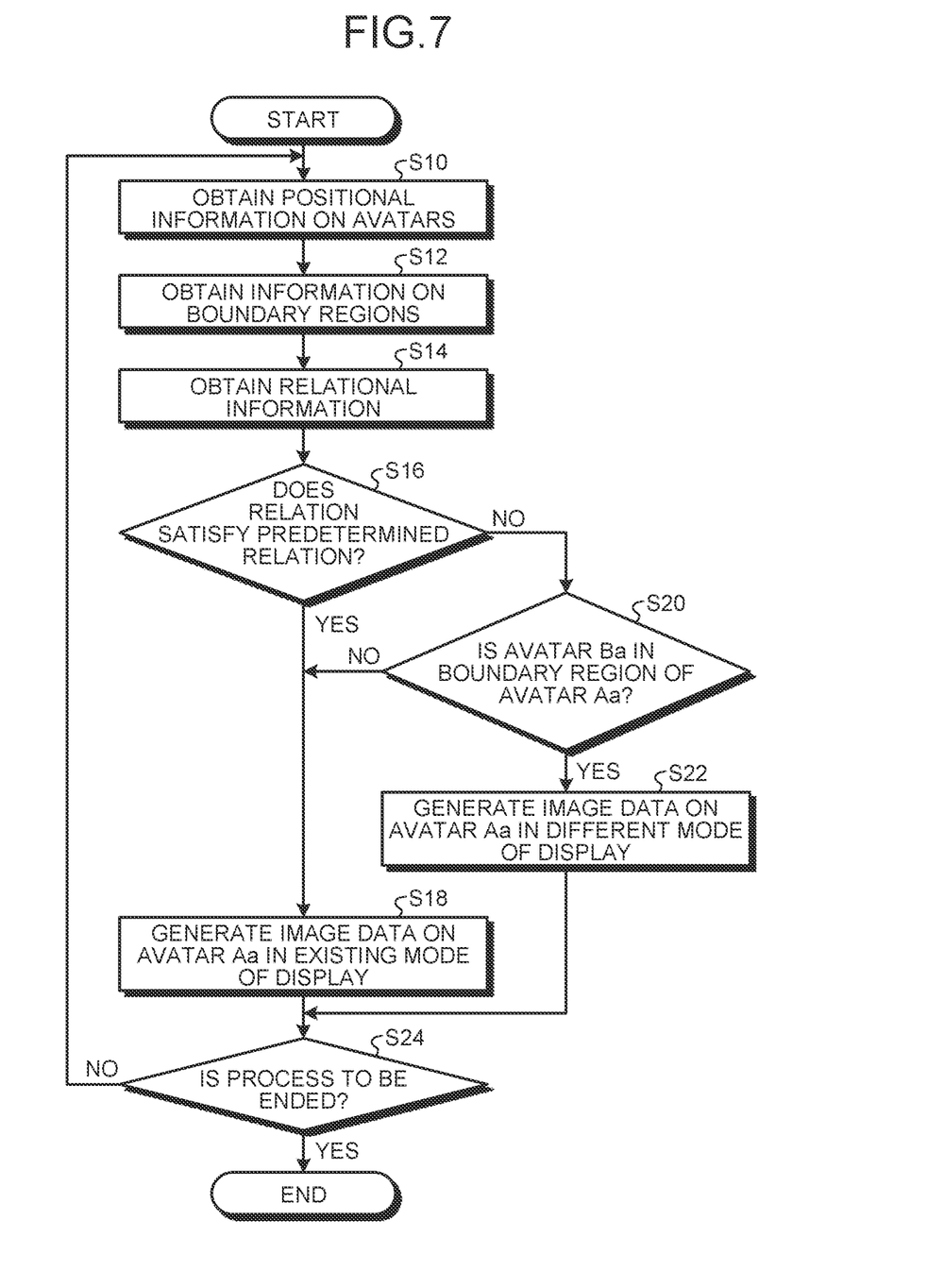
FIG. 7 is a flowchart illustrating a flow of a process for image data generation by the image processing device.

A flow of a process of image data generation by the image processing device 12 will be described next. The following description is on an example of a case where image data on the avatar Aa of the user A are generated for the display device 10B of the user B. FIG. 7 is a flowchart illustrating a flow of the process for image data generation by the image processing device 12.

As illustrated in FIG. 7, the image processing device 12 obtains positional information on avatars by means of the positional information obtainment unit 60 (Step S10), obtains information on boundary regions AR by means of the boundary region obtainment unit 62 (Step S12), and obtains relational information by means of the relation obtainment unit 64 (Step S14). Steps S10, S12, and S14 may be performed in any order without being limited to this example. Thereafter, the image processing device 12 determines, by means of the image processing unit 66, whether or not the relational information on the user A and the user B satisfies a predetermined relation (Step S16), and in a case where the predetermined relation is satisfied (Step S16; Yes), generates image data on the avatar Aa for the existing mode of display, that is, for example, without imparting transparency (Step S18). The image processing device 12 then transmits image data on a virtual space SV in the field of view V of the avatar Ba, to the display device 10B of the user B, the image data including the image data on the avatar Aa. On the basis of the image data received, the display device 10B displays an image of the virtual space SV that is in the field of view V of the avatar Ba.

On the contrary, in a case where the relational information on the user A and the user B does not satisfy the predetermined relation (Step S16; No), the image processing unit 66 determines whether the avatar Ba is positioned in the boundary region ARA of the avatar Aa (Step S20), and in a case where the avatar Ba is not positioned in the boundary region ARA (Step S20; No), proceeds to Step S18 and generates image data on the avatar Aa for the existing mode of display, that is, for example, without imparting transparency. On the contrary, in a case where the avatar Ba is positioned in the boundary region ARA of the avatar Aa (Step S20; Yes), the image processing unit 66 generates image data on the avatar Aa for a different mode of display, that is, for example, by imparting transparency (Step S22). The image processing device 12 then transmits image data on a virtual space SV in the field of view V of the avatar Ba, to the display device 10B of the user B. On the basis of the image data received, the display device 10B displays an image of the virtual space SV that is in the field of view V of the avatar Ba.

After Steps S18 and S22, in a case where the process is not to be ended (Step S24; No), the process is returned to Step S10 to be resumed, and in a case where the process is to be ended (Step S24; Yes), the process is ended.

The above described process is executed for each combination of a pair of avatars. It is now assumed that in FIG. 4, for example, all of relational information on the users A and B, the users B and C, and the users A and C is non-friendship information. It is also assumed that the avatar Aa is positioned outside the range of the boundary region ARC of the avatar Ca and the avatar Ca is in the field of view of the avatar Aa. Furthermore, it is assumed that the avatar Ca is positioned in the range of the boundary region ARA of the avatar Aa and the avatar Aa is in the field of view of the avatar Ca. In this case, the avatar Ca is captured in the image provided to the display device 10A of the user A but the avatar Aa is not captured in the image provided to the display device 10C of the user C. If the avatar Ba of the user B is outside the range of the boundary region ARA of the avatar Aa of the user A and outside the range of the boundary region ARC of the avatar Ca of the user C, and the avatars Aa and Ca are in the field of view of the avatar Ba, both the avatars Aa and Ca are captured in the image provided to the display device 10B of the user B.

Effects

As described above, the image processing device 12 according to the embodiment performs image processing for a virtual space SV and includes the positional information obtainment unit 60, the boundary region obtainment unit 62, the relation obtainment unit 64, and the image processing unit 66. The positional information obtainment unit 60 obtains information on positions of a first avatar (avatar Aa) of a first user (user A) in the virtual space SV and a second avatar (avatar Ba) of a second user (user B) in the virtual space SV. The boundary region obtainment unit 62 obtains information on a first boundary region (boundary region ARA) that is a region set for the avatar Aa, the region being around the avatar Aa in the virtual space SV. The relation obtainment unit 64 obtains relational information indicating a relation between the user A and the user B. The image processing unit 66 generates image data for the virtual space SV to be provided to the user B. In a case where the relation between the user A and the user B satisfies a predetermined condition, the image processing unit 66 generates image data to be provided to the user B such that the mode of display of the avatar Aa for when the avatar Ba is positioned in the boundary region ARA is made the same as the mode of display of the avatar Aa for when the avatar Ba is positioned outside the boundary region ARA. On the contrary, in a case where the relation between the user A and the user B does not satisfy the predetermined condition, the image processing unit 66 generates image data to be provided to the user B such that the mode of display of the avatar Aa for when the avatar Ba is positioned in the boundary region ARA is made different from the mode of display of the avatar Aa for when the avatar Ba is positioned outside the boundary region ARA.

In the image processing device 12 according to the embodiment, in the case where the relational information on the user A and the user B does not satisfy the predetermined condition, as the avatar Ba approaches the avatar Aa (as the avatar Ba enters the boundary region ARA), the mode of display of the avatar Aa in an image seen by the user B is changed. Therefore, privacy of the user A in the virtual space SV is able to be protected appropriately.

Furthermore, the boundary region obtainment unit 62 obtains information on a second boundary region (boundary region ARB) that is a region set for the avatar Ba, the region being around the avatar Ba in the virtual space SV. The image processing unit 66 generates image data for the virtual space SV to be provided to the user A. In the case where the relation between the user A and the user B satisfies the predetermined condition, the image processing unit 66 generates image data to be provided to the user A such that the mode of display of the avatar Ba for when the avatar Aa is positioned in the boundary region ARB is made the same as the mode of display of the avatar Ba for when the avatar Aa is positioned outside the boundary region ARB. On the contrary, in the case where the relation between the user A and the user B does not satisfy the predetermined condition, the image processing unit 66 generates image data to be provided to the user A such that the mode of display of the avatar Ba for when the avatar Aa is positioned in the boundary region ARB is made different from the mode of display of the avatar Ba for when the avatar Aa is positioned outside the boundary region ARB. Privacy of the user B in the virtual space SV is thus also able to be protected appropriately because the image processing device 12 according to the embodiment changes the mode of display of the avatar Ba of the user B for the image data to be provided to the user A. Furthermore, because a boundary region is set for each avatar, the degree of protection of the privacy is able to be adjusted appropriately in accordance with that user U.

The image processing unit 66 determines that the predetermined condition is satisfied in a case where the relation between the user A and the user B indicates that the user A and the user B have a friendship with each other. The image processing device 12 according to the embodiment protects the privacy and enables communication to be supported, by not changing the mode of display in the case where the users have a friendship with each other and changing the mode of display in the case where the users do not have a friendship with each other.

In a case where the relation between the user A and the user B does not satisfy the predetermined condition and the avatar Ba is positioned in the boundary region ARA, the image processing unit 66 increases the degree of change in the mode of display of the avatar Aa as the distance between the avatar Aa and the avatar Ba decreases. The image processing device 12 according to the embodiment enables the privacy of the user A to be protected appropriately because the change in the mode of display is increased as the distance to the avatar Aa is decreased.

The image processing unit 66 executes, as a process of changing the mode of display of the avatar Aa, at least one of: a process of making the avatar Aa transparent; a process of converting the avatar Aa to another avatar Xa; and a process of reducing resolution of the image of the avatar Aa. The image processing device 12 according to the embodiment enables appropriate protection of the privacy of the user A by such change in the mode of display.

In the embodiment, the image processing device 12 has functions of the positional information obtainment unit 60, the boundary region obtainment unit 62, the relation obtainment unit 64, and the image processing unit 66, but the display device 10 may have these functions. That is, the display device 10 may function as the image processing device 12 or may include at least one of the positional information obtainment unit 60, the boundary region obtainment unit 62, the relation obtainment unit 64, and the image processing unit 66 and execute its process or their processes.

Other Examples

Figure 8A:
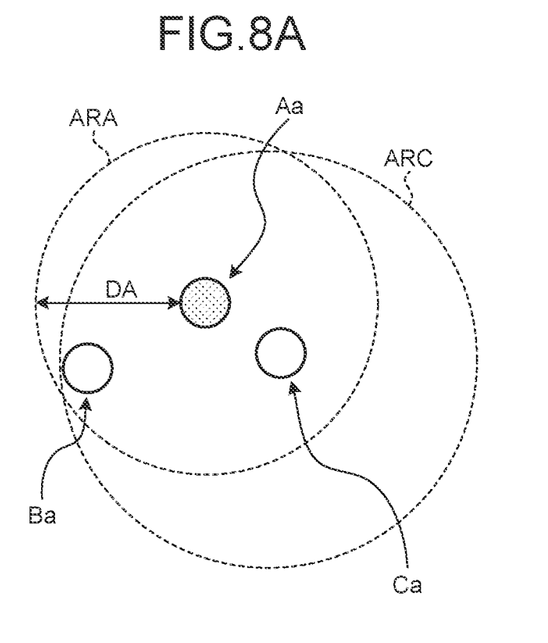
FIGS. 8A and 8B are schematic diagrams illustrating another example of modes of display for an avatar.

What are described hereinafter are other examples of a process of changing the mode of display by means of the image processing unit 66. FIGS. 8A and 8B are schematic diagrams illustrating another example of modes of display for an avatar. It is assumed herein, for example, that the users A and C have a friendship with each other, the users B and C have a friendship with each other, and the users A and B do not have a friendship with each other. As illustrated in FIG. 8A, it is then assumed that the avatar Ba of the user B is in both the boundary region ARA of the avatar Aa of the user A and the boundary region ARC of the avatar Ca of the user C. In this case, according to the above description of the embodiment, the avatar Ca with the friendship is displayed on the display device 10B of the user B but the avatar Aa without the friendship is not displayed on the display device 10B of the user B. In this case, for example, if the users A and C are communicating with each other via the avatars Aa and Ca, an image in which the avatar Ca alone is communicating is displayed on the display device 10B and the image may look strange.

Figure 8B:
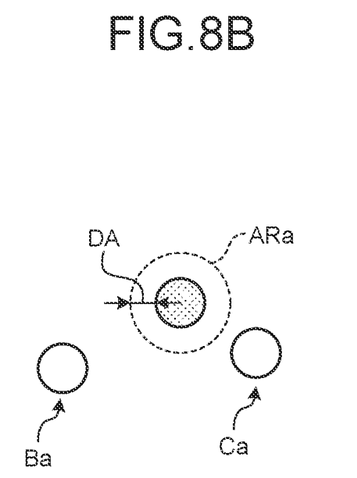

Therefore, in this example, for such a case, if the image processing unit 66 has determined that the users A and C are communicating with each other via the avatars Aa and Ca, the image processing unit 66 may decrease the degree of change of the mode of display of the avatar Aa. That is, for example, as illustrated in FIG. 8A, the degree of change in the mode of display (transparency herein) between a case where the avatar Ba is in the boundary region ARA of the avatar Aa and a case where the avatar Ba is not in the boundary region ARA of the avatar Aa may be decreased or the mode of display may be not changed (may be made non-transparent). The avatar Aa is thereby also displayed on the display device 10B and thus the strangeness can be eliminated. Furthermore, for example, as illustrated in FIG. 8B, in a case where the image processing unit 66 has determined that the users A and C are communicating via the avatars Aa and Ca, the image processing unit 66 may decrease the size of the boundary region ARA of the avatar Aa. As a result, the avatar Aa will not become transparent unless the avatar Aa is approached considerably and the strangeness can thus be eliminated.

In this example, any method may be adopted for determination of whether or not the users A and C are communicating with each other via the avatars Aa and Ca. For example, in a case where the users A and C are transmitting and receiving information to and from each other via the display device 10A, the image processing device 12, and the display device 10C in a form not public to other users, the image processing device 12 may determine that the users A and C are communicating with each other via the avatars Aa and Ca. Furthermore, for example, in a case where a state in which the avatar Aa and the avatar Ca are facing each other has continued for a predetermined time period or longer in a virtual space SV, the image processing device 12 may determine that the users A and C are communicating with each other via the avatars Aa and Ca.

Another example will be described next. In the embodiment, in a case where an avatar without a friendship is in a boundary region of a certain avatar, that certain avatar will not be displayed on a display device 10 of the user without the friendship. However, in some cases, communication with a large number of unspecified users is desired, for example, and in such a case, if the avatar disappears from the display device 10 of the user without the friendship, communication with a large number of unspecified users via avatars is not possible. By contrast, in this example, an open region is set in the virtual space SV, the open region being a region (space) in which the mode of display is not to be changed even if another avatar is in the boundary region AR. For example, it is assumed the users A and B do not have a friendship with each other, the users A and C do not have a friendship with each other, and the avatars Ba and Ca are in the boundary region ARA of the avatar Aa. Even in this case, if the avatar Aa is in the open region, the image processing device 12 displays the image of the avatar Aa in the existing mode of display without making the image of the avatar Aa transparent in the images for the display devices 10B and 10C of the users B and C. Each user U is preferably notified of positional information on the open region in the virtual space SV beforehand via the display device 10 by the image processing device 12. A user U may move the avatar to the open region if the user U wants to communicate with a large number of unspecified users and not move the avatar to the open region if the user U wants to protect the user U's privacy.

Still another example will be described next. In the embodiment, whether the mode of display is to be changed is determined on the basis of whether or not the avatar Ba is in the boundary region ARA of the avatar Aa, but the method for this determination is not limited to that in the embodiment, and for example, whether the mode of display is to be changed may be determined on the basis of also the time period over which the avatar Ba has closely watched the avatar Aa. In this case, for example, in a case where relational information on the user A and the user B does not satisfy the predetermined condition, the image processing unit 66 determines whether the avatar Ba is positioned in the boundary region ARA of the avatar Aa (that is, whether the distance L is equal to or less than the distance D that is the radius of the boundary region ARA) and determines whether the line of sight of the avatar Ba overlaps the position of the avatar Aa. The line of sight of the avatar Ba may be set as appropriate on the basis of the orientation of the avatar Ba, and may be, for example, a straight line passing through the center of the field of view V, may extend in a conical shape from the avatar Ba, or may extend in a shape other than a conical shape. The image processing unit 66 determines whether the time period over which the line of sight of the avatar Ba overlaps the position of the avatar Aa exceeds a threshold. In a case where the relational information on the user A and the user B does not satisfy the predetermined condition, the avatar Ba is positioned in the boundary region ARA of the avatar Aa, and the time period over which the line of sight of the avatar Ba overlaps the position of the avatar Aa exceeds the threshold, the image processing unit 66 determines that the mode of display is to be changed.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device that performs image processing for a virtual space, the image processing device comprising:
   a positional information obtainment unit that obtains information on a position of a first avatar that is an avatar of a first user in the virtual space and a position of a second avatar that is an avatar of a second user in the virtual space, the positions being in the virtual space;
   a boundary region obtainment unit that obtains information on a first boundary region set for the first avatar, the first boundary region being a region in the virtual space and around the first avatar;
   a relation obtainment unit that obtains relational information indicating a relation between the first user and the second user; and
   an image processing unit that generates image data for the virtual space such that a first mode of display of the first avatar for when the second avatar is positioned in the first boundary region is made different from a second mode of display of the first avatar for when the second avatar is positioned outside the first boundary region, in a case where the relation does not satisfy a predetermined condition, wherein
   the image processing unit determines that the predetermined condition is satisfied in a case where the relation indicates that the first user and the second user have a friendship with each other, and
   the image processing unit changes the first boundary region according to a level of the friendship, and when the first avatar and a third avatar that is an avatar of a third user in the virtual space are communicating with each other, changes the first boundary region.

2. The image processing device according to claim 1, wherein the image processing unit increases a degree of change in the mode of display of the first avatar as a distance between the first avatar and the second avatar decreases, in a case where the relation does not satisfy the predetermined condition and the second avatar is positioned in the first boundary region.

3. The image processing device according to claim 1, wherein the image processing unit executes, as a process of changing the mode of display of the first avatar, at least one of: a process of making the first avatar transparent; a process of converting the first avatar to another avatar; and a process of reducing resolution of an image of the first avatar.

4. The image processing device according to claim 1, wherein when the first avatar and the third avatar are communicating with each other, the image processing unit generates image data for the virtual space such that a degree of change between the first mode of display of the first avatar and the second mode of display of the first avatar is made smaller than that for when the first avatar and the third avatar are not communicating with each other, or does not generate the image data for the virtual space, the image data enabling the first mode of display and the second mode of display to be different from each other.

5. The image processing device according to claim 1, wherein the image processing unit generates image data for the virtual space such that the first mode of display of the first avatar for when the second avatar is positioned in the first boundary region is made different from the second mode of display of the first avatar for when the second avatar is positioned outside the first boundary region, in a case where the relation does not satisfy the predetermined condition and a time period over which the second avatar has closely watched the first avatar exceeds a predetermined threshold.

6. An image processing method of performing image processing for a virtual space, the image processing method including:
   a step of obtaining information on a position of a first avatar that is an avatar of a first user in the virtual space and a position of a second avatar that is an avatar of a second user in the virtual space, the positions being in the virtual space;
   a step of obtaining information on a first boundary region set for the first avatar, the first boundary region being a region in the virtual space and around the first avatar;
   a step of obtaining relational information indicating a relation between the first user and the second user; and
   a step of generating image data for the virtual space such that a first mode of display of the first avatar for when the second avatar is positioned in the first boundary region is made different from a second mode of display of the first avatar for when the second avatar is positioned outside the first boundary region, in a case where the relation does not satisfy a predetermined condition, wherein
   the step of generating the image data includes
      determining that the predetermined condition is satisfied in a case where the relation indicates that the first user and the second user have a friendship with each other, and
      changing the first boundary region according to a level of the friendship, and when the first avatar and a third avatar that is an avatar of a third user in the virtual space are communicating with each other, changing the first boundary region.

7. A non-transitory computer readable recording medium storing therein a program that causes a computer to execute an image processing method of performing image processing for a virtual space, the program causing the computer to execute:
   a step of obtaining information on a position of a first avatar that is an avatar of a first user in the virtual space and a position of a second avatar that is an avatar of a second user in the virtual space, the positions being in the virtual space;
   a step of obtaining information on a first boundary region set for the first avatar, the first boundary region being a region in the virtual space and around the first avatar;

a step of obtaining relational information indicating a relation between the first user and the second user; and a step of generating image data for the virtual space such that a first mode of display of the first avatar for when the second avatar is positioned in the first boundary region is made different from a second mode of display of the first avatar for when the second avatar is positioned outside the first boundary region, in a case where the relation does not satisfy a predetermined condition, wherein the step of generating the image data includes
- determining that the predetermined condition is satisfied in a case where the relation indicates that the first user and the second user have a friendship with each other, and
- changing the first boundary region according to a level of the friendship, and when the first avatar and a third avatar that is an avatar of a third user in the virtual space are communicating with each other, changing the first boundary region.

* * * * *